May 10, 1927.
J. STEIN
1,628,203
MACHINE FOR UNITING SHEET RUBBER
Filed Nov. 8, 1924
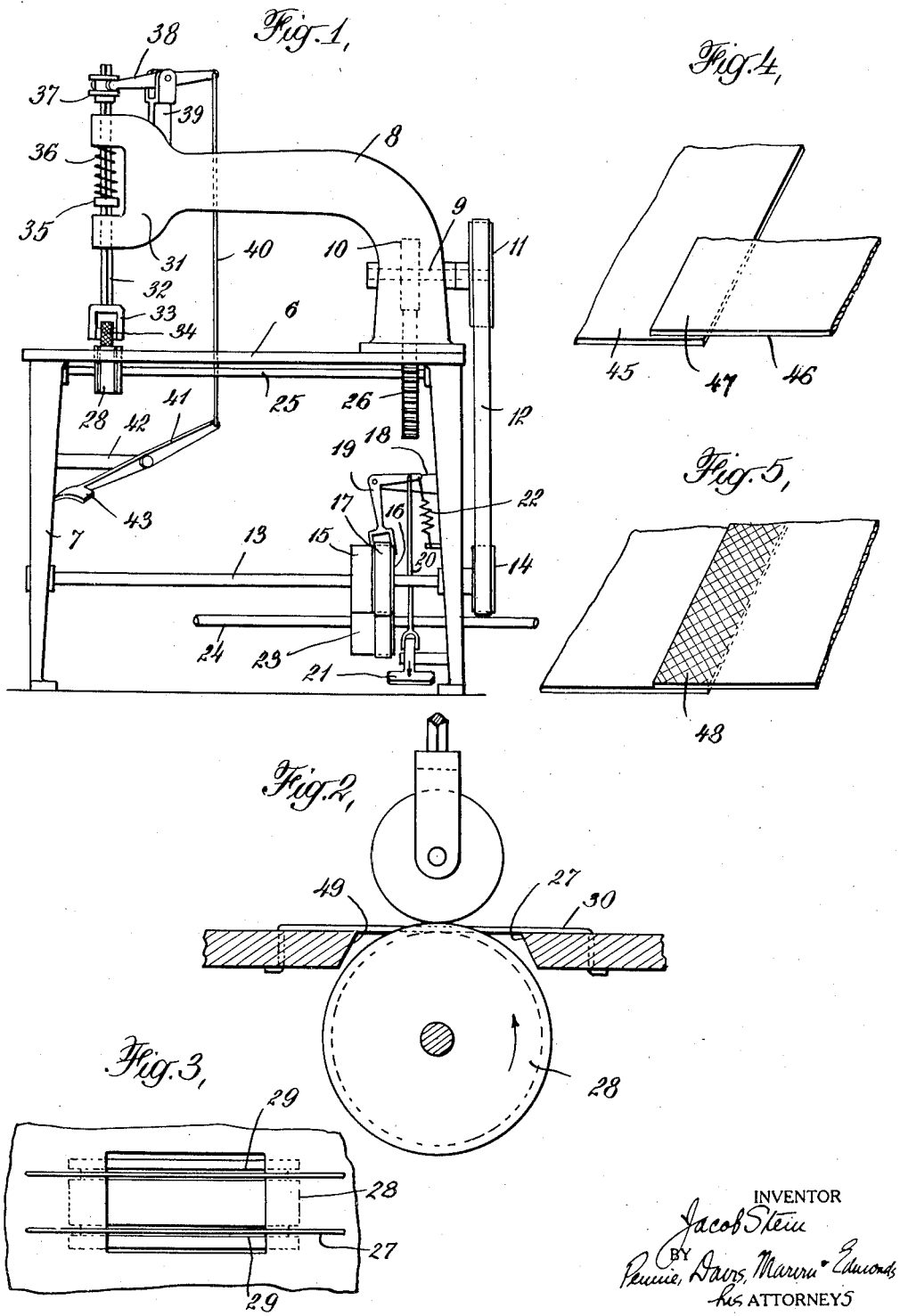

Patented May 10, 1927.

1,628,203

UNITED STATES PATENT OFFICE.

JACOB STEIN, OF NEW YORK, N. Y.

MACHINE FOR UNITING SHEET RUBBER.

Application filed November 8, 1924. Serial No. 748,615.

This invention relates to a machine for uniting pieces of unvulcanized rubber, and is intended more particularly for use in uniting sheets of such material so that upon vulcanization the pieces or sheets will constitute a continuous and substantially homogeneous whole.

In the manufacture of rubber articles, as for instance, bathing caps and baby garments, these articles may be made from sheets of vulcanized rubber, the different pieces which compose the garment being either cemented together, or else united by means of stitching. Neither of these methods is entirely satisfactory, because the cementing operation requires considerable care and it is difficult to secure a firm adhesion of the pieces in this way. Stitching is even less satisfactory, because the passage of threads through the pieces of rubber weakens the rubber material and the acids which are used in the curing of the rubber rot the thread. Furthemore, the union of the two parts by means of stitching will not produce a water-tight joint.

According to another method of manufacture of such articles, the articles are formed of uncured or unvulcanized rubber. The plastic rubber masses, after proper mastication, are calendered into sheets of the desired thickness, and pieces of the proper configuration are produced from these sheets by suitable apparatus, usually punch presses. The pieces of which the article is to made are then united by a pressing operation, the edges of the two pieces which are to be joined being placed in overlapping relation and then subjected to pressure so as to cause the surfaces of the uncured rubber pieces to adhere. The degree of adhesion between the pieces will depend, to a large extent, on the pressure which is employed, but it is not difficult to cause these pieces to adhere sufficiently firmly to permit the article to be handled to the extent required during the curing operation. By the application of pressure along the overlapping portions of the articles, the two surfaces appear to unite in a manner somewhat similar to the action which takes place in the welding of metals, and the two edges will adhere with sufficient strength to permit the articles to be handled to the extent required in the curing operation.

Machines for the purpose of subjecting the overlapping edges of the two pieces of rubber which are to be joined to pressure have heretofore been used, and in one machine which has been devised for the purpose there is employed a feeding mechanism similar to that used in a sewing machine. A feeding member is made use of which has a roughened upper surface and this feeding member lies in an aperture within a table. It is given a repeated reciprocating movement which causes it to be raised and moved in a direction transversely of the table, and placed above the aperture in the table, through which the feeding element is exposed, is a roller pressed downwardly under spring pressure. The two pieces of rubber which are to be united are placed with their edges in overlapping relation, and the lap seam is directed beneath the roller. As the machine is operated, the feeding element moves upwardly and subjects the edges of the two pieces to a hammering action against the face of the roller, at the same time causing these pieces to be fed forwardly. By the continuation of the operations the sheets are subjected to repeated hammer blows along the line of overlap and at the same time are fed forwardly so that the operator's attention is not required except to direct the pieces properly through the machine. The seam produced on such a machine, however, is not entirely satisfactory because it will be observed that the two overlapping edges are not subjected to uniform pressure, but to a series of more or less spaced blows, so that different parts of the seam are more firmly coherent than others. It has heretofore been thought necessary, however, to employ this type of machine because of the fact that the rubber material is somewhat tacky and if rolls were employed the material would adhere to the rolls and would be drawn down between the surface of the roll and the table and thus be torn.

The present invention is intended to provide a machine in which the sheets are united by the use of pressing rollers, the machine being provided, however, with suitable clearing means to prevent the adherence of the tacky rubber sheets to these rollers. With this machine, therefore, it is possible to produce a seam in which the parts are uniformly coherent and at the same time to avoid any possibility of tearing of the material by reason of the sticking of the sheets to the pressing rolls. The machine involves the provision of a pair of rolls which are pressed together by suitable spring means. One of these rolls is mounted in a table and a portion of its surface projects through an aperture in the table. This roll is provided with circumferential grooves suitably disposed so that the grooves lie on either side of the area of contact of the two rolls. Clearing devices which may take the form of wires, are fixed in the surface of the table and extend across the aperture and across the roll exposed therethrough, a portion of the wires entering the circumferential grooves. The overlapping edges of the two sheets to be united are then introduced into the bite of the rolls, and as one of the rolls is rotated by suitable means, the sheets are drawn through the rolls and subjected to a uniform pressure. The presence of the clearing devices serves to prevent the material being acted on from adhering to the lower roll, and thus the machine produces uniformly united seams, and the rate of production is much more rapid than that capable on the machines in which the reciprocating member is employed.

In the accompanying drawings, I have illustrated a machine in that form which is considered preferable, and in these drawings, Fig. 1 is a side elevation of the machine, Fig. 2 is a view of a detail of the rolls, showing parts in cross section, Fig. 3 is a plan view of a portion of the table, showing the lower roll exposed therethrough, Fig. 4 is a perspective view showing two pieces of rubber placed in the overlapping relation usually employed in making the seams, and Fig. 5 is a similar view showing the seam after it has been subjected to the roll pressure.

In these drawings the machine is seen to consist of a table 6, suitably supported on legs 7, in any convenient location. Extending upwardly from the table is an overhanging arm 8. In the vertical portion of the arm there is mounted in suitable bearings, a shaft 9, carrying a gear 10 which may be placed within the arm, or may be placed in a suitable housing outside the arm. On the end of the shaft is a pulley 11, on which runs a belt 12. Beneath the table and mounted in suitable bearings between the legs, is a shaft 13, carrying a pulley 14, over which the belt 12 runs. The shaft 13 also carries a pair of pulleys 15 and 16, the pulley 15 being loosely mounted on the shaft, while the pulley 16 is rigidly secured thereto. A belt 17 runs over the pulleys 15 and 16, and mounted on a bracket 18 is a bell crank 19, the end of which carries a fork which engages the belt. Connected with the other arm of the bell crank is a vertical rod 20, which is connected at its lower end to a treadle 21, and a spring 22 secured to the same arm of the bell crank as the rod 20, is secured at its other end to a fixed part of one of the legs 7. The arrangement is such that when the treadle is depressed the bell crank is moved so as to shift the belt upon the fast pulley, thus causing the machine to be driven, since the belt 17 also runs over a pulley 23, mounted on a shaft 24 driven from any suitable source of power. When the treadle is released the spring 22 causes the bell crank to swing so as to shift the belt 17 upon the loose pulley, thus disconnecting the machine from the source of power.

A shaft 25 is mounted in suitable bearings beneath the table of the machine, and at one end it carries a gear 26 which meshes with the gear 10 on the shaft 9. Near the other end of the table there is an aperture 27, and a roll 28 mounted on the shaft 25 has a portion of its surface which projects through and above this aperture. This roll 28 is fast on the shaft and driven therewith. The roll is provided with circumferential grooves 29, these grooves being here shown as two in number, one being placed near either end of the roll. Fixed at their ends in the table are wires 30, which extend across the aperture and the roll, a portion of each wire being received in one of the circumferential grooves. As shown more clearly in Fig. 2, the wires lie substantially flush with the top of the table and the grooves in the rolls are of such depth that the bottom of the groove in that part of the roll which is exposed lies substantially in the same plane as the top of the table. Thus the wires 30 may extend practically in a straight line across the aperture.

The arm 8 has a portion which extends parallel to the table and which terminates above the aperture through which the roll 28 is exposed. This end 31 is forked and suitable apertures are formed through it in which is received a rod 32, the lower end of which carries a fork 33, between the two members of which is pivotally mounted a milled roll 34. This roll lies with its axis parallel to the axis of the roll 28; that is, parallel to the shaft 25, and the width of the roll is somewhat less than the distance between the pair of grooves 29, 29. A collar 35 is secured on the rod 32 between the members of the forked end 31 of the arm 8, and a spring 36 encircles the rod and bears at one end against the arm and at the other against the collar. This spring is arranged to force the rod downwardly, thus causing the two rolls to contact with a yielding pressure. Above the arm 8 the rod 32 is provided with a collar 37, to which is secured one end of a lever 38, pivoted in a suitable bracket 39, secured to the arm. The other end of this lever has attached to it a vertical rod 40, which extends downwardly and at its lower end is connected to a lever 41, pivoted on a suitable bracket 42. The end of the lever 41 contains a suitable knee treadle 43 and when this treadle is raised the connected rods and levers cause the roll 34 to be displaced from the roll 28. Upon release of the treadle the spring 36 causes the two rolls to come into contact. The rod 32 is preferably given a square cross section, or it may be provided with a key, so that in its up and down movement it will not have a tendency to rotate so as to cause the roll 34 to be displaced with relation to the roll 28.

When the machine is to be used, the two pieces of rubber are laid on the table at the front of the machine, with the edges which are to be united in overlapping relation, as indicated at 47. The operator then depresses the foot treadle so as to cause the roll 28 to be rotated and at this time the knee treadle is also released so that the idler roll 34 will be forced downwardly against the surface of the driven roll. The pieces of rubber are then moved forward until the edge of the seam is gripped between the rolls, whereupon the rotation of the rolls will cause the material to be fed through them. In its passage therethrough the lapped portions are forced together by the pressure of the spring 36 which produces a firmly coherent seam, as indicated at 48. The operator does not give the rubber any feeding movement, but simply makes sure that the portions of the seam will be properly drawn between the rolls. It will be understood, of course, that in Figs. 4 and 5 the union of two separate pieces of rubber has been illustrated, but the machine is equally useful for the folding back and uniting of an edge portion to a main portion of a rubber sheet, the process being similar to that described. In its movement between the rolls the rubber being somewhat tacky normally has a tendency to stick to the lower roll, which has a smooth surface. Such sticking will not ordinarily occur in connection with the upper roll, because this upper roll has a knurled surface, and the operator, in guiding the material, will place his hands on the sheets at either side of the rolls, thus causing the rubber to move over the table with an even movement. Ordinarily, however, there would be a tendency of the tacky rubber to stick to the lower roll, and consequently as this roll is moving in the direction indicated by the arrow in Fig. 2, if nothing were done to prevent such action, the rubber would be drawn into the space indicated at 49, between the surface of the lower roll and the table. If such a drawing action occurred, the rubber sheet material would probably be torn, and, in any event the operator would have to stop the machine and withdraw the material and smooth it out. By the provision of the clearing devices, here illustrated in the form of wires, any sticking of the rubber material to the surface of the lower roll is prevented. These wires direct the material across the aperture substantially in a plane, and as they are placed at either side of the area of contact of the two rolls, they do not interfere in any way with the uniting action produced by the roll pressure. The provision of such a clearing device, therefore, has made it possible to secure the advantages incident to the use of rolls; that is, a more uniform union at a higher speed of production, but the disadvantages inherent in this type of machine have been avoided, in that the sticking of the fed material to the rolls has been prevented without consequent injury to the material, and the delays caused by the slowing down and starting up of the machine.

Furthermore, the use of the clearing mechanism does not require that the operator should give such close attention to the action of the machine as was heretofore necessary, and since the seam is produced by a uniform pressure and not by a succession of hammer blows there is no likelihood that the material will be injured in those regions where the hammering action takes place.

I claim:

1. A machine for uniting rubber sheets, which comprises the combination of a table, a roll mounted in the table and having a portion of its face exposed through an aperture in the table, driving means for this roll, a second roll resiliently held with its face in contact with the first roll, this roll having a length less than the length of the first roll, and clearing means extending across the aperture and the exposed surface of the first roll and lying beyond either end of the line of contact of the two rolls.

2. A machine for uniting rubber sheets which comprises the combination of a table, a roll mounted in the table and having a portion of its face exposed through an aperture in the table, driving means for this roll, a second roll mounted above the first roll and normally bearing against its exposed face with yielding pressure, and clearing means mounted in the table and extending across the aperture and the exposed surface of the first roll, the said clearing means lying beyond either end of the line of contact of the two rolls.

3. A machine for uniting rubber sheets which comprises the combination of a table, a roll mounted beneath the table and having a portion of its face exposed through an aperture in the table, this roll having spaced circumferential grooves in its face, a second roll bearing resiliently against the first roll between the grooves the width of the face of the second roll being less than the distance between the grooves, and clearing wires extending across the aperture and entering the grooves.

4. A machine for uniting rubber sheets which comprises the combination of a table, a shaft mounted beneath the table, a roll mounted on the shaft and having a portion of its face exposed through an aperture in the table, this roll having spaced circumferential grooves in its face, driving means for the shaft, means for controlling the operative connection between the shaft and the driving means, a roll resiliently held against the first roll between the grooves the width of the face of the second roll being less than the distance between the grooves, and clearing wires secured at their ends in the table and extending across the aperture with portions entering the grooves.

5. A machine for uniting rubber sheets which comprises the combination of a table having an overhanging arm, a roll mounted in the table beneath the arm and having a portion of its surface exposed through an aperture in the table, this roll having spaced circumferential grooves, a vertical rod mounted in the arm, resilient means engaging the rod for forcing it downward, a roll rotatably mounted in the end of the rod and adapted to be held against the exposed portion of the first roll between the grooves the width of the face of the second roll being less than the distance between the grooves, clearing wires extending across the aperture in the table and entering the exposed portions of the grooves, and means for raising the second roll clear of the first.

6. A machine for uniting rubber sheets which comprises the combination of a table, a roll mounted in the table and having a portion of its face exposed through an aperture in the table, this roll having circumferential grooves, a pressure roll bearing resiliently against the first roll between the grooves the width of the face of the pressure roll being less than the distance between the grooves, means for driving one of the rolls, means for effecting their relative displacement, and clearing wires extending across the aperture and entering the exposed portions of the grooves.

7. A machine for uniting rubber sheets which comprises the combination of a table, a shaft mounted in the table, driving means including a clutch for driving the shaft, a roll mounted on the shaft and having a portion of its surface exposed through an aperture in the table, this roll having spaced circumferential grooves in its face, an arm extending above the table, a spring-pressed vertical rod in the arm, a roll mounted in the rod with its axis parallel to the shaft and held with its face in contact with the exposed portion of the first roll between the grooves therein the width of the face of the second roll being less than the distance between the grooves, and clearing wires secured in the table and extending across the aperture, these wires having portions lying in the exposed portions of the grooves.

8. In a machine for uniting sheets of rubber, the combination of a roll with circumferential grooves, a second roll bearing against the first between the grooves the width of the face of the second roll being less than the distance between the grooves, and clearing means lying in a plane lying parallel to the axis of the grooved roll, the said means having portions entering the grooves.

9. In a machine for uniting sheets of rubber, the combination of a roll with spaced circumferential grooves, a second roll bearing against the first between the grooves the width of the face of the second roll being less than the distance between the grooves, and clearing means extending transversely of the axis of the first roll and having portions entering the grooves.

10. In a machine for uniting sheets of rubber, the combination of a table having an aperture, a roll projecting partly through the aperture and having a pair of spaced circumferential grooves, the bottoms of those portions of the grooves which lie in the projecting portion of the roll lying substantially in the plane of the surface of the table, and clearing wires extending across the aperture in the table and entering the exposed portions of the grooves.

In testimony whereof I affix my signature.

JACOB STEIN.